(12) United States Patent
Iwasaki et al.

(10) Patent No.: US 7,672,572 B2
(45) Date of Patent: *Mar. 2, 2010

(54) RECORDING APPARATUS AND RECORDING METHOD

(75) Inventors: Shiro Iwasaki, Iizuka (JP); Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 10/712,341

(22) Filed: Nov. 14, 2003

(65) Prior Publication Data

US 2004/0136693 A1 Jul. 15, 2004

(30) Foreign Application Priority Data

Nov. 15, 2002 (JP) ............................. 2002-331899

(51) Int. Cl.
*H04N 7/00* (2006.01)

(52) U.S. Cl. ...................... 386/100; 386/113; 386/125

(58) Field of Classification Search ................ 386/100, 386/113, 125
See application file for complete search history.

(56) References Cited

U.S. PATENT DOCUMENTS

| | | | |
|---|---|---|---|
| 5,214,781 A | 5/1993 | Miki et al. | |
| 6,813,437 B2 | 11/2004 | Ando et al. | |
| 6,819,865 B2 | 11/2004 | Ando et al. | |
| 6,862,401 B1 * | 3/2005 | Higashida et al. | 386/100 |
| 6,879,773 B2 | 4/2005 | Ando et al. | |
| 7,068,919 B2 | 6/2006 | Ando et al. | |
| 7,076,153 B2 | 7/2006 | Ando et al. | |
| 7,340,153 B2 | 3/2008 | Isobe et al. | |
| 7,346,266 B2 | 3/2008 | Ando et al. | |
| 2001/0009604 A1 | 7/2001 | Ando et al. | |
| 2001/0009605 A1 | 7/2001 | Ando et al. | |
| 2001/0010755 A1 | 8/2001 | Ando et al. | |
| 2001/0012443 A1 | 8/2001 | Ando et al. | |

(Continued)

FOREIGN PATENT DOCUMENTS

CN 1305187 7/2001

(Continued)

OTHER PUBLICATIONS

U.S. Patent Office Official Action issued in U.S. Appl. No. 10/712,372, mailed on Jun. 19, 2007.

(Continued)

*Primary Examiner*—Marsha D Banks Harold
*Assistant Examiner*—Daniel Tekle
(74) *Attorney, Agent, or Firm*—Wenderoth, Lind & Ponack, L.L.P.

(57) ABSTRACT

An apparatus and method of addressing data losses when power to a digital recorder is unexpectedly interrupted during recording, and the file management information needed to play back digital content is not completely written to a disc. The recovery process for correcting inconsistencies between the AV data and management information left on the disc is time-consuming. By recording the recovery data used for the data recovery process when power is turned on again, the management information can be recompiled based on the recovery data. Thus, inconsistencies between the AV data and management information can be corrected. Additionally, AV data and recovery data in this case can be written alternately to contiguous areas on disc.

12 Claims, 9 Drawing Sheets

U.S. PATENT DOCUMENTS

| | | |
|---|---|---|
| 2002/0018644 A1 | 2/2002 | Isobe et al. |
| 2004/0126101 A1* | 7/2004 | Nakamura et al. .......... 386/124 |
| 2007/0086749 A1 | 4/2007 | Isobe et al. |
| 2008/0008457 A1 | 1/2008 | Ando et al. |

FOREIGN PATENT DOCUMENTS

| | | |
|---|---|---|
| JP | 2-33621 | 2/1990 |
| JP | 2000-268537 | 9/2000 |
| JP | 2001-126405 | 5/2001 |
| JP | 2001-243707 | 9/2001 |
| JP | 2001-266496 | 9/2001 |
| JP | 2002-260368 | 9/2002 |

OTHER PUBLICATIONS

Chinese Office Action dated Sep. 21, 2007, issued in Chinese Application No. 200310116160.4 with English translation.

* cited by examiner

RECORDING APPARATUS AND RECORDING METHOD

BACKGROUND OF THE INVENTION

The present invention relates generally to a digital recording apparatus, and relates more particularly to technology improving the efficiency of a recovery process resolving inconsistencies in AV data and AV data management information left on the disc when the power supply is unexpectedly interrupted.

Digital recorders for recording television programs, movies, and other types of high volume moving picture content to hard disk drive (HDD), Digital Versatile Disc (DVD), and more recently Blu-ray Disc (BD) media are now widely available.

In addition to recording MPEG-encoded AV data, for example, such digital recorders also record management information for the AV data to the digital recording medium. This management information typically includes the title, recording date, aspect ratio, and AV data stream information (data size, time table, frame information) for the AV data content.

One object of conventional digital recorders using optical discs, magneto-optical discs, and other digital media has been to shorten the required processing time when recorder power is turned on and off, and when a disc is loaded and ejected (see Japanese Patent Laid-Open Publication (kokai) 2002-260368).

The device taught in Kokai 2002-260368 segments the recording area into multiple zones, and records the management information to an AV management area in either the zone where the magnetic recording head is currently positioned or in an adjacent zone. The address of the area where the management information is recorded is also stored to nonvolatile memory incorporated in the disc cartridge, and when drive power is turned on or a disc is loaded, the disc recorder reads the management information by referencing the address stored to this nonvolatile memory.

This shortens the seek time of the magnetic head when writing the management information, and shortens the processing time required when the power turns on and off and when a disc is loaded and ejected.

The object of this related art is thus to shorten the magnetic head seek time when reading and writing management information when the power turns on or off and when a disc is loaded or ejected, and the management information is written to the digital recording medium only when drive power is intentionally turned off or the disc is ejected.

If the power supply is interrupted during recording due to a power failure or the power cord being accidentally unplugged, however, management information for the recorded data is not written to the recording medium. This unrecorded management information is thus lost and cannot be recorded when the power supply is restored. An inconsistency between the management information on the disc and the recorded AV data thus results when the power supply is returned, and a recovery process for rectifying this inconsistency is needed.

Two basic methods are available for correcting inconsistencies between the AV data and management information during the recovery process: interpolating the lost management information according to the AV data left on disc, and deleting the AV data to match the management information left on disc. The former method involves analyzing the AV data and interpolating the management information based on the analysis, and therefore requires analyzing the AV data.

The problem with the latter method is that only the management information written to the recording medium the last time the disc was normally ejected or the power was normally turned off remains on the disc, and all management information relating to the AV data recorded until just before the power supply failed or was interrupted is lost as a result of the sudden power interruption. All AV data for the program or content recorded until just before the power supply was unexpectedly interrupted must therefore be erased.

Furthermore, while real-time processing is not necessary to recover and record directory information for regular data, the management information recovery and recording process for AV data must run in real time. This is because if a head seek occurs while recording AV data and the recovery data is recorded to a different area, and the head then returns to the original location to continue recording the next AV data block, AV data must be buffered to memory for a period equal to the time needed for the two seek operations and recording the recovered data, but if a buffer of sufficient size to store the AV data during this time is provided, product cost rises accordingly.

An object of the present invention is therefore to provide a digital recording apparatus that can efficiently complete a recovery process for fixing inconsistencies between the AV data and management information left on the disc when the power supply is unexpectedly interrupted during recording, such as when a power failure occurs or the power cord is accidentally unplugged.

SUMMARY OF THE INVENTION

A first aspect of the present invention is a recording apparatus for recording to a recording medium AV data containing at least one of audio data and video data, and recovery data for restoring management information for the AV data when AV data recording did not end normally. The recording apparatus has means for generating recovery data for each constant or variable period; means for generating AV data; and recording means for recording the recovery data while interleaving the recovery data with the AV data during AV data recording.

A second aspect of the invention is a recording method for recording to a recording medium AV data containing at least one of audio data and video data, and recovery data for restoring management information for the AV data when AV data recording did not end normally. This recording method has steps of: generating recovery data for each constant or variable period; generating AV data; and recording the recovery data while interleaving the recovery data with the AV data during AV data recording.

Thus comprised, our invention minimizes the drop in the AV data recording rate in the event recovery data is recorded while recording AV data.

Our invention also enables AV data to be recovered.

The recovery data preferably contains file management information for the recorded AV data, thereby enabling recovering AV data.

The recovery data preferably contains playback time information for the recorded AV data.

This shortens the time needed for the AV data recovery process.

Further preferably, the AV data is MPEG-encoded data, and the recovery data contains a start address for an I-picture in the recorded AV data.

This enables the recovery process to be easily achieved.

Further preferably, the invention stores recovery data address information indicating the address of the recovery data to a predefined location.

This enables the recovery process to be run easily and efficiently.

The recovery data address information preferably contains multiple storage banks.

This enables the recovery process to be run easily even with recording media that can only be recorded a limited number of times.

A further aspect of the invention stores recovery data address information indicating the address of the recovery data to a recovery data file of a predetermined specified name.

This enables the recovery process to be run easily even with recording media that can only be recorded a limited number of times.

Preferably in this case multiple recovery data files are recorded.

This enables the recovery process to be run easily even with recording media that can only be recorded a limited number of times.

Further preferably, the recovery data address information contains a serial number or time information for the recovery data.

This enables the most recent recovery data address information to be easily identified from among multiple recovery data address information entries.

Yet further preferably, there are at least two recovery data entries, and the recovery data is recorded interleaved with the AV data during AV data recording.

Thus comprised, our invention minimizes the drop in the AV data recording rate in the event recovery data is recorded while recording AV data.

Preferably, the recovery data contains recording address information for the previously recorded recovery data.

This simplifies searching for recovery data.

Further preferably the recovery data contains difference information from previously recorded recovery data.

Thus comprised, our invention minimizes the drop in the AV data recording rate in the event recovery data is recorded while recording AV data.

Further preferably, the recovery data contains address information for recovery data recorded next.

This simplifies searching for the next recovery data.

Further preferably, the recovery data contains identification information for identifying recovery data.

This enables the recovery data to be easily distinguished from the AV data.

Further preferably, the recovery data is interleaved with AV data units of a specific size.

This simplifies searching for recovery data.

Alternatively, the recovery data is interleaved with AV data units of a specific recording time.

This simplifies searching for recovery data.

Alternatively, the recovery data is interleaved every specific recording unit of AV data.

This enables a simple recovery data recovery process.

Yet further preferably, the address information recorded in the recovery data is recorded in a separate recording device such as nonvolatile memory.

This enables the most recent recovery data address information to be stored in nonvolatile memory when the address of the recovery data is updated, and enables the location of the most recent recovery data to be easily acquired in the recovery process.

Yet further preferably, the nonvolatile memory storing the address where the recovery data is recorded is preferably removably disposed.

This enables data to be recovered on a device other than that used to record the AV data, which is particularly useful when the device that recorded the AV data becomes unusable.

The recovery data preferably contains a serial number or time information. This enables the most recent recovery data to be found by using the serial number or time information recorded in the recovery data.

Thus comprised, the present invention enables an efficient recovery process for correcting inconsistencies between the AV data and management information left on disc when an unexpected power supply interruption occurs during recording due to a power failure or the power cord being unplugged, for example.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of a digital recording apparatus and recording method according to the present invention are described below with reference to the accompanying figures.

Embodiment 1

Figure 1:
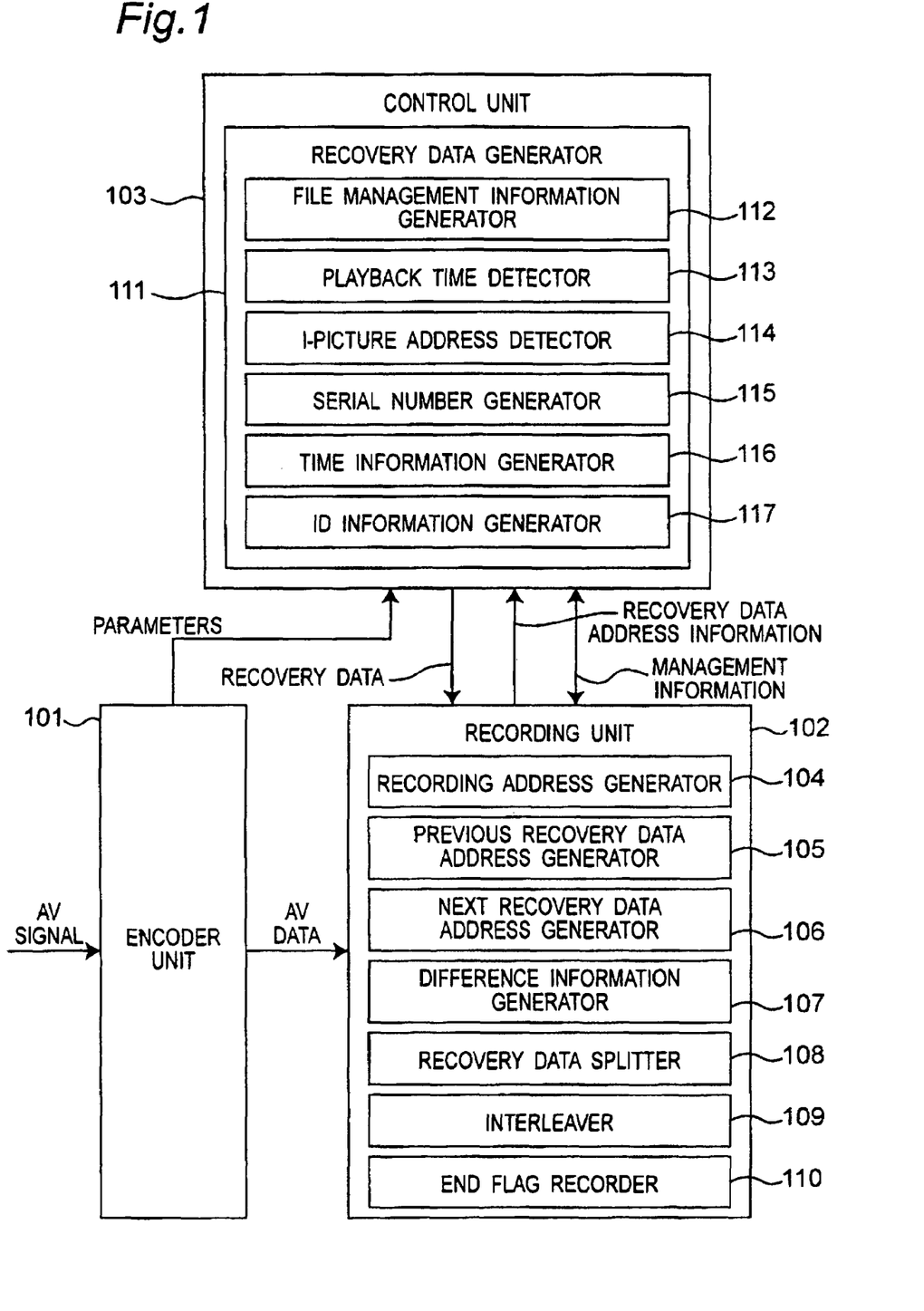
FIG. 1 is a block diagram of a recording apparatus according to a first embodiment of the present invention.

FIG. 1 is a schematic block diagram showing the configuration of a recording apparatus according to a first embodiment of the invention. The recording apparatus of this first embodiment as show in FIG. 1 has an encoder unit 101, recording unit 102, and control unit 103. The input AV signal includes at least audio data or video data.

The encoder unit 101 compression codes the input AV signal according to the MPEG format, for example, and outputs AV data to the recording unit 102. The encoder unit 101 also outputs AV data encoding parameters, such as the GOP (Group Of Picture) size, I-picture (Intra picture) size, frame number, and audio attributes (monaural, stereo, multilingual), to the control unit 103.

This embodiment is described using an MPEG format for compression coding, but compression coding shall not be limited to MPEG formats and other schemes could be used instead.

The recording unit 102 could be any recording device for recording to such media as HDD, optical discs such as DVD and BD, and magneto-optical discs. The recording unit 102 receives AV data from the encoder unit 101 and management information and recovery data from the control unit 103 for recording control and recording AV data. This recovery data is data enabling the AV data management information to be repaired when recording the AV data is not ended normally due to a power supply interruption resulting from an unexpected power failure, for example, during recording.

The control unit 103 controls recording AV data management information and recovery data to the recording unit 102. The management information includes information relating to the AV data based on the parameters received from the encoder unit 101, and information relating to program content. The AV data parameter information includes, for example, the size of the AV data, I-picture size, frame number, and audio attributes, and the content-related information includes the program title, broadcast date and time, broadcast channel, and broadcast genre. The recovery data includes parameters needed to generate the management information. Management information is written to the recording unit 102 when the power is turned off, when the storage medium is ejected, and when recording is completed, for example.

The recording unit 102 has a recording address generator 104, previous recovery data address generator 105, next recovery data address generator 106, difference information generator 107, recovery data splitter 108, interleaver 109, and end flag recorder 110. The recording unit 102 controls compiling and recording the recovery data to disc by means of parts 104 to 110.

The recording address generator 104 generates the recording address of the recorded AV data and recovery data. The previous recovery data address generator 105 generates the address of the previously recorded recovery data, and the next recovery data address generator 106 generates the address of the next-recorded recovery data. The difference information generator 107 produces information defining a difference from the previously recorded recovery data.

The recovery data splitter 108 divides the recovery data into at least two parts, and the interleaver 109 records while interleaving the AV data and recovery data. The end flag recorder 110 products an end flag set to an OFF state when recording new AV data, and generates an ON end flag when all AV data and file management information has been recorded by the recording unit 102. These end flags are recorded in memory, such as flash memory, in the recorder. If recording data to the recording medium (HDD, optical disc, or other) has not been completed when the power supply is unexpectedly interrupted due to a power failure, for example, the end flag indicates that a recovery process using the recovery data must be run. More specifically, whether the end flag is set to the ON or OFF state is determined when the power turns on. If the end flag is in the OFF state the recorder knows that data recording is not terminate normally, and therefore runs a recovery process using the recovery data. If the end flag is ON, however, the recovery process is skipped.

The control unit 103 has a recovery data generator 111. The recovery data generator 111 produces and acquires the recovery data parameters, and generates the recovery data. The resulting data is then written by the recording unit 102. The recovery data generator 111 also has a file management information generator 112, playback time detector 113, I-picture address detector 114, serial number generator 115, time information generator 116, and ID information generator 117.

The file management information generator 112 produces file management information for the record d AV data. The playback time detector 113 gets information relating to the playback time of the recorded AV data. The I-picture address detector 114 gets the starting address for each I-picture in the recorded AV data when the AV data is MPEG encoded. The serial number generator 115 generates a serial number for each recovery data address or recovery data block. The time information generator 116 produces time information denoting when the recovery data address or recovery data was recorded. The ID information generator 117 generates ID information enabling the recovery data and other recorded data to be separately identified.

Note that FIG. 1 shows possible configurations for the recovery data generator 111 having parts 112 to 117, and the recording unit 102 having parts 104 to 110, the recovery data generator 111 could be otherwise configured to generate the recovery data. The recovery data generator 111 could also have only a subset of parts 112 to 117, and the recording unit 102 could have only the interleaver 109.

Figure 2:
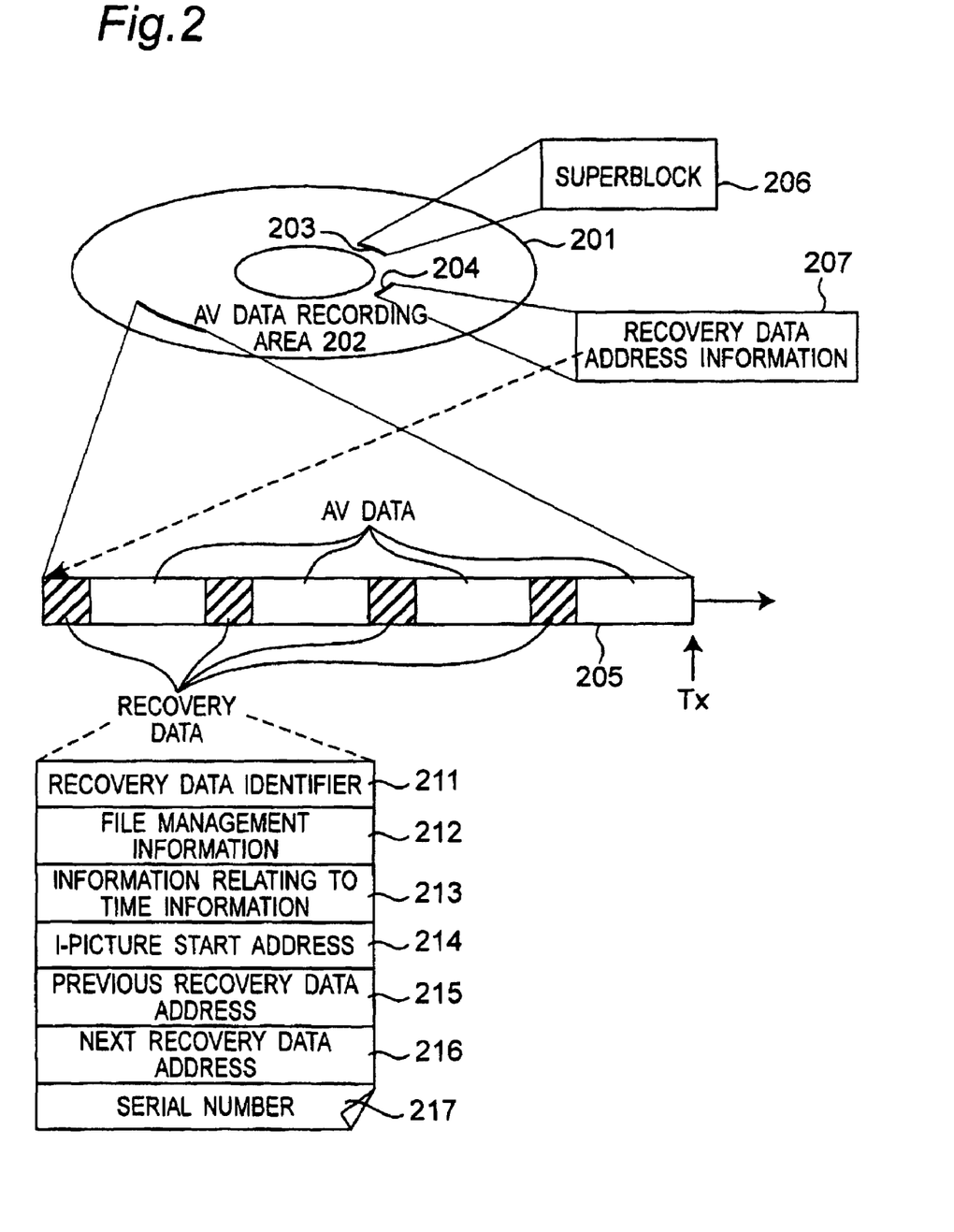
FIG. 2 shows an example of where data is recorded to the recording medium in a preferred embodiment of the invention.

FIG. 2 shows how AV data and recovery data recorded by the recording unit 102 are arranged on the recording medium (optical disc, HDD, or other recording medium, referred to as simply "disc" below). As shown in FIG. 2 the disc 201 has an area 202 for recording an AV data stream 205, an area 203 for recording superblocks 206, and an area 204 for recording recovery data address information 207. The superblock recording area 203 is disposed in the lead-in area, for example. The recovery data address information recording area 204 is disposed near the superblock recording area 203. The AV data stream recorded in the AV data recording area 202 contains alternately interleaved AV data and recovery data. AV data disposed between two recovery data blocks is called an AV data segment.

The recovery data includes at least one of recovery data identifier 211, file management information 212, information relating to time information 213, I-picture start address 214, previous recovery data address 215, next recovery data address 216, and serial number 217.

The recovery data identifier 211 is generated by the ID information generator 117 and written to the beginning of the recovery data. When the recovery data address information 207 cannot be read, the recovery data can still be found by detecting the recovery data identifier 211.

The file management information 212 is generated by the file management information generator 112 and includes the file or directory name, sector location information, data size, user name, and access privileges. The sector location information includes the address of every sector used in the file recording area 202. The file management information is equivalent to the file management information (also called the file attributes) contained in the superblocks. The information relating to time information 213 contains the playback time information generated by the playback time detector 113.

The I-picture start address 214 contains the start address of every I-picture contained in an AV data segment as generated by the I-picture address detector 114. This could be simplified to contain only the start address of the first I-picture in an AV data segment instead of address information for all I-pictures.

The previous recovery data address 215 contains the address of the preceding recovery data block as generated by the previous recovery data address generator 105. The next recovery data address 216 contains the address of the next recovery data block as generated by the next recovery data address generator 106. The serial number 217 is generated by the serial number generator 115 by the recovery data. These serial numbers are unique, non-repeating sequential numbers within a single recording medium.

Recording the AV data stream is described next.

When recording the AV data stream begins, the end flag recorded in the drive's flash memory is turned OFF and the first recovery data is generated. The first recovery data is written from a selected location in the AV data recording area 202. The address (denoted by LBA (logical block address) or CHS (cylinder, head, sector) values) of the selection location is written to recording area 204 as the recovery data address.

An AV data segment is then written and two recovery data blocks are generated and written after the AV data segment.

When the last AV data segment is recorded the last recovery data block is generated and written after the last AV data segment.

Management information for the AV data is then compiled and recorded to the superblock recording area 203. The end flag is then set ON and recording the AV data stream is finished.

To play back normally recorded AV data, the superblock recording area 203 is first accessed to read the AV data management information and then read the AV data based on the management information.

If the power supply is interrupted due to a power failure, for example, before recording the AV data stream is completed, recording ends without the management information for the recorded AV data being recorded to the superblock recording area 203.

Let us assume, for example, that the power supply was interrupted at time Tx in FIG. 2. When power is later returned, the recorder detects the end flag. The end flag remains set OFF, however, and the recorder therefore knows that recording the AV data stream was not finished. The recorder therefore accesses the recovery data address recording area 204, reads the recovery data address information, accesses the beginning of the recovery data and reads the recovery data, and then accesses the next recovery data block and reads that recovery data. The recorder can thus read all recorded recovery data. In the example shown in FIG. 2 the recorder can read four recovery data blocks. Based on the read recovery data the recorder generates management information for the partially recorded AV and writes it to the superblock. In this example management information for the first three AV data segments is compiled and written to a superblock. These first three AV data segments can therefore be reproduced.

By thus writing the AV data and recovery data interleaved, seek operations for writing the recovery data do not occur while recording AV data, and the recovery data can be recorded at the same time as the AV data. The AV data and recovery data can therefore be recorded to the AV data recording area 202 without a drop in the write bit rate for seek operations.

The timing for interleaving the recovery data to the AV data is described next.

Figure 3A:
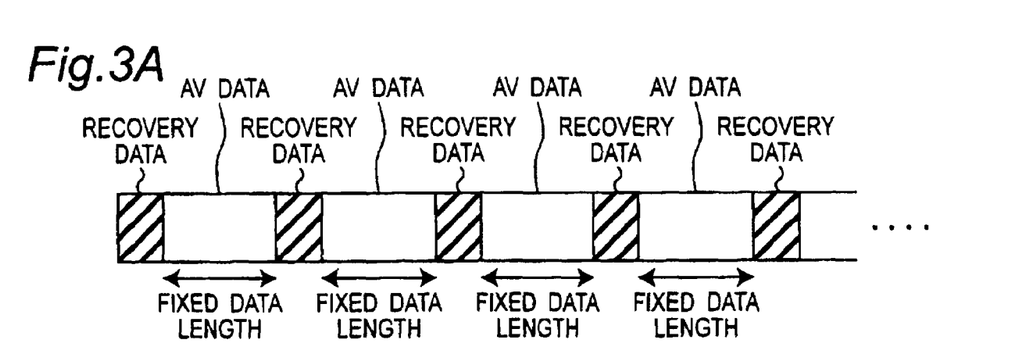
FIG. 3 shows various ways AV data and recovery data can be recorded interleaved in a preferred embodiment of the invention.

FIG. 3A shows interleaving the recovery data after recording a fixed length (byte size) of AV data. In this example the recovery data is recorded after recording 256 MB of AV data. In this case the recording address generator 104 shown in FIG. 1 generates the address AD1 where recording the first recovery data block begins. This address AD1 is written as recovery data address Information 207 to recording area 204. Because no recovery data is located before the first recovery data block, no address information is supplied from the previous recovery data address generator 105. However, because other recovery data is found after this first recovery data address, the address AD2 where recording the second recovery data block starts is also generated based on the following equation:

$$AD2=AD1+C1$$

where C1 is a constant such as the address offset equal to the 256 MB plus the size of the recovery data block. The recovery data is also a fixed length in this example.

In general terms, when the n-th recovery data block is recorded, the recording address generator 104 generates address AD(n) denoting the address of recovery data n, previous recovery data address generator 105 generates AD(n−1) denoting the address from where recovery data n−1 is recorded, and next recovery data address generator 106 generates address AD(n+1) denoting the address from where recovery data n+1 is recorded.

Figure 3B:
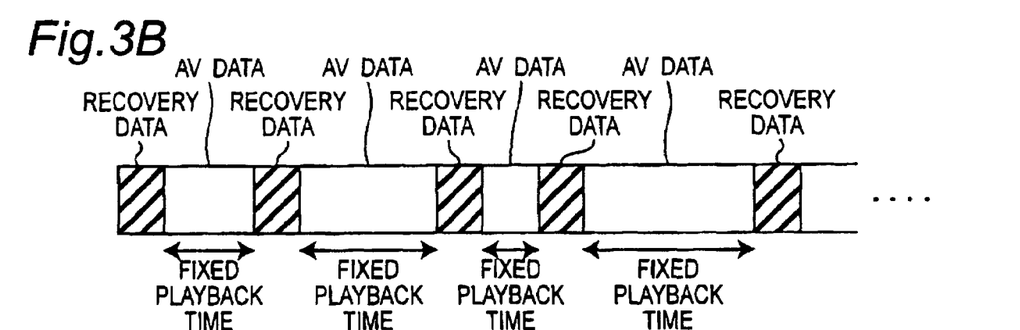

FIG. 3B shows interleaving the recovery data after recording AV data for a fixed playback time. In this example the recovery data is recorded after every 30 seconds of AV data or after every 900 frames of AV data. Because the byte size of each AV data segment is not constant in this case, a buffer capable of storing address AD1 denoting where recording the first recovery data block begins, th address AD2 denoting where recording the second recovery data block begins, and therefore at least one AV data segment, is provided, and address AD2 is generated after determining the byte size of the AV data segment.

Figure 3C:
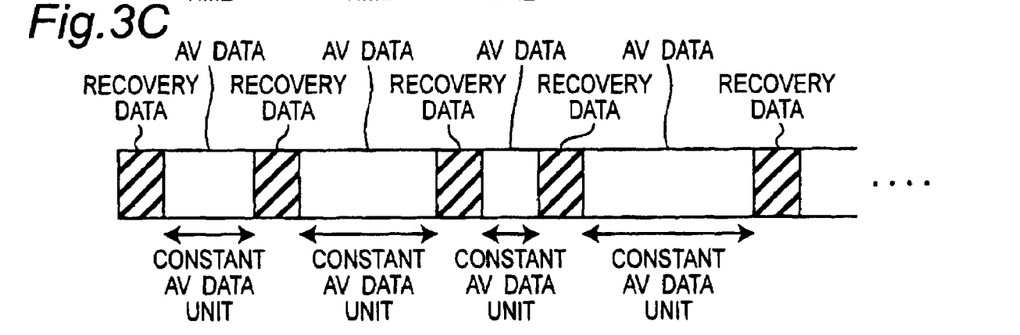

FIG. 3C shows interleaving the recovery data after recording a fixed number of AV data units, for example, after recording 40 GOP of AV data or after recording 40 I-picture frames. Because the byte length of the recorded AV data segment is therefore variable, a buffer capable of storing at least one AV data segment must also be provided in this case, too.

Other interleaving schemes are also possible. For example, the recovery data could be interleaved with the AV data at a timing (that is, when there is sufficient time to access the AV data recording area 202 and sufficient time to record the recovery data to the recording area 202) less than or equal to a specific frequency of read or write access to the AV data recording area 202 based on the remaining capacity of a temporary buffer for AV data reading/writing or the number of read/write requests queued in a read/write process.

The recovery data can be written to the AV data recording area 202 interleaved with the AV data at any one or combination of the times described above.

Figure 4A:
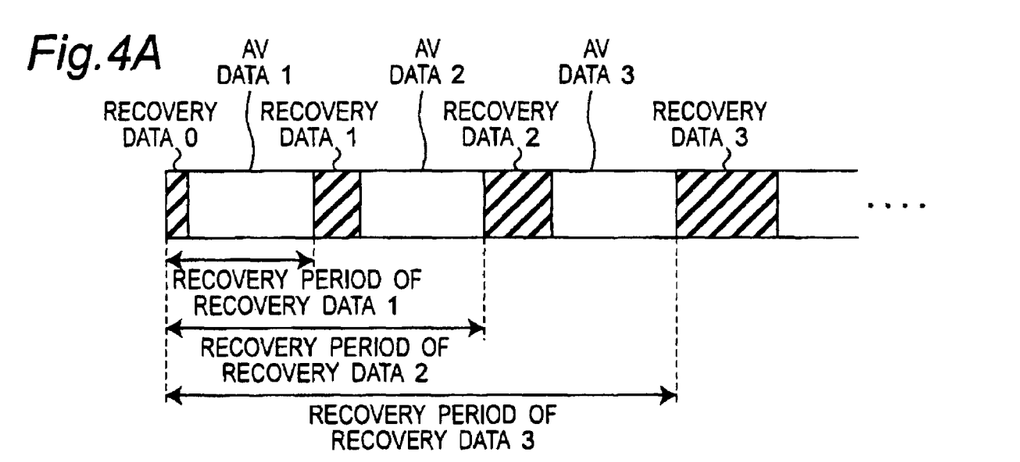
FIG. 4 shows other ways AV data and recovery data can be recorded interleaved in a preferred embodiment of the invention.
Figure 4B:
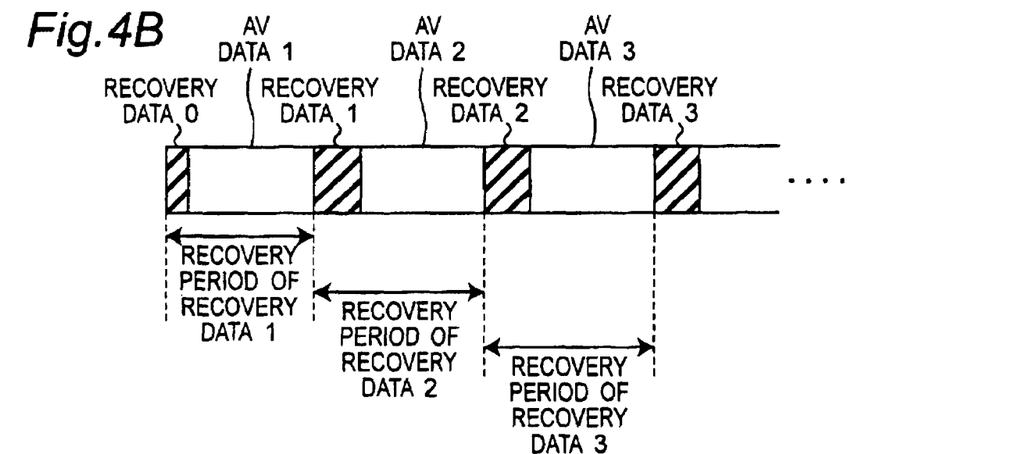

FIG. 4A and FIG. 4B describe the relationship between recovery data and the corresponding AV data. As th number of AV data segments increases and the recorded AV data increases, the recovery data required to recover all AV data to the end of the AV data that was recorded also increases. For example, the number of I-picture addresses increases as the number of recorded I-pictures increases. The number of sectors used also increases, and so the file management information containing sector address information also increases.

FIG. 4A shows a case in which the recovery data is cumulatively written so that each recovery data block enables recovering all AV data segments recorded from the time a file was opened to the time that a particular recovery data block is written. This means that as the AV data recording time gets longer, the amount of data written to each successive recovery data block increases.

FIG. 4B, however, shows a case in which differential recovery data is recorded, i.e., only the recovery data needed to recover the immediately preceding AV data segment is recorded. Because only the recovery data needed to recover the immediately preceding AV data segment is written in the case shown in FIG. 4B, the amount of data written to each recovery data block is constant or substantially constant regardless of the AV data recording time.

It will thus be obvious that the method shown in FIG. 4B writes less recovery data than the method shown in FIG. 4A. On the other hand, the method shown in FIG. 4A enables recovering all AV data using only the last recorded recovery data, but the method shown in FIG. 4B requires gathering the first to the last recovery data blocks, i.e., all recovery data, in order to recover all AV data segments.

If the amount of recorded recovery data is reduced as shown in FIG. 4B, the size of the buffer needed to accumulate AV data while the recovery data is being recorded can be reduced, and the manufacturing cost of the recorder can therefore also be reduced.

If each recovery data block contains the previous recovery data address 215 instead of the next recovery data address 216, all recovery data can be acquired by sequentially collecting the previous recovery data from the address information stored in the newest recovery data. In this case the address of the newest recovery data can be recorded as the recovery data address in area 204.

Conversely, if each recovery data entry contains the next recovery data address 216 instead of the previous recovery data address 215, all recovery data can be acquired by sequentially collecting the next recovery data from the address information in the first recovery data. In this case the address of the first recovery data can be recorded as the recovery data address in area 204.

FIG. 5 describes the recovery data address information.

Figure 5A:
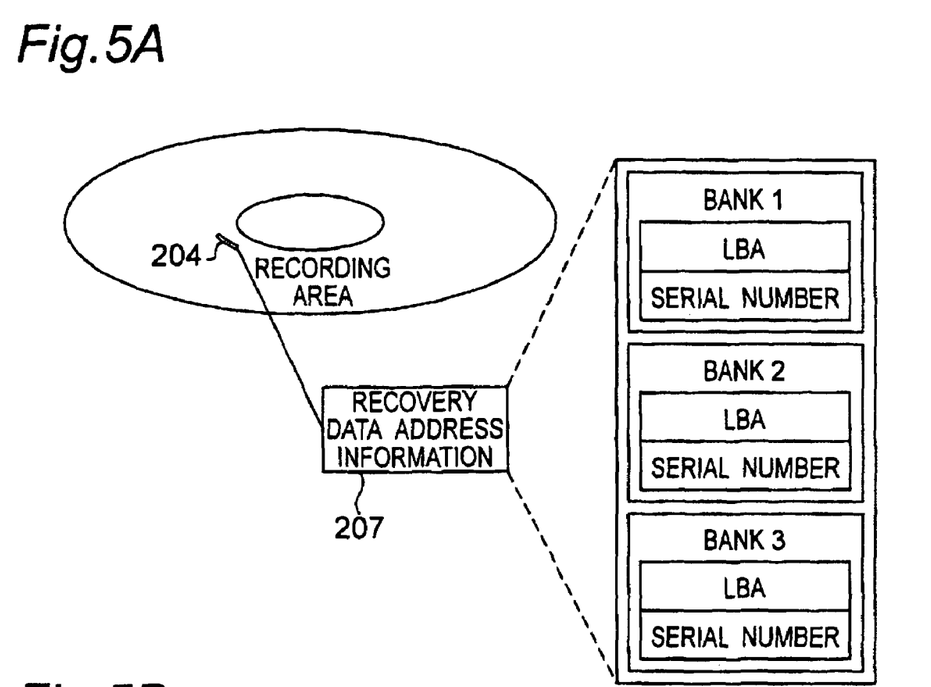
FIG. 5 shows different locations where recovery data can be recorded in a preferred embodiment of the invention.

FIG. 5A shows recording the recovery data address information to area 204. This recovery data address recording area 204 is, for example, a 4-byte area at the beginning of the lead-in area, at the inside circumference of the disc, or at the outside circumference of the disc. Unlike the data content written to the AV data recording area 202, area 204 is a uniquely identifiable read/write area. The recovery data address information 207 could be a LBA (logical block address) or CHS (cylinder, head, sector) value denoting where the recovery data is located. Information other than the LBA or CHS could be used instead insofar as it enables uniquely locating the recovery data.

The example shown in FIG. 5A records multiple banks, labelled here bank 1, bank 2, and bank 3, to area 204. When the first AV data stream, such as a movie, is recorded, the address of the first recovery data in that AV data stream is recorded to bank 1 in LBA format. The serial number of the first recovery data is also recorded in this example, but could be omitted. When a second AV data stream, such as the broadcast of a baseball game, is then recorded, the address of the first recovery data in that second AV data stream is recorded to bank 2. When a third AV data stream, such as a news broadcast, is later recorded, the address of the first recovery data in that third AV data stream is recorded to bank 3. When a fourth AV data stream, such as a broadcast of a golf match, is then recorded, the address of the first recovery data in this fourth AV data stream is recorded to bank 1.

It is possible to use only one bank, but by using multiple banks, such as bank 1, bank 2, and bank 3 in this example, recovery data address information can be sequentially overwritten to the multiple banks. This reduces the number of times an individual bank in area 204 is rewritten, and thereby increases the number of times the recording medium can be rewritten when the recording medium can only be written a limited number of times, as is the case with optical disc media and flash memory.

Adding a serial number to the recovery data address information enables the recorder to determine which bank stores the newest recovery data. It will also be obvious that time information could be recorded instead of a serial number.

Furthermore, if writing the recovery data fails due to a power failure, for example, while recording the recovery data address information, data recovery is still enabled using the previously recorded recovery data address information if the recovery data address information is sequentially recorded to multiple banks.

Figure 5B:
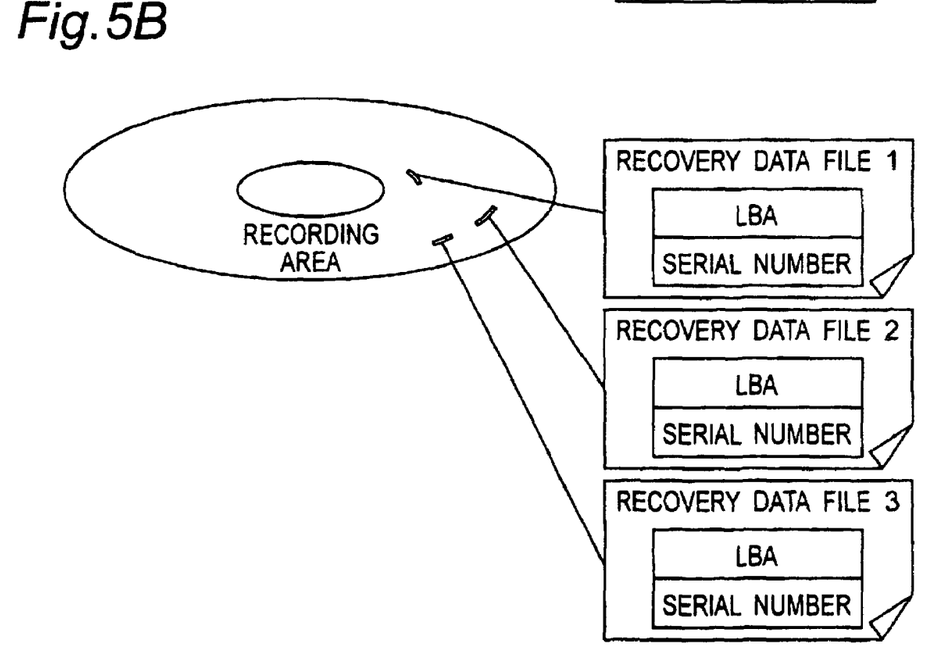

FIG. 5B shows an example in which the recovery data address information is stored to discrete files. In addition to recording to a specific predefined area 204 as described above, the recovery data address information is also written to files with specific predetermined names. If there are multiple files thus storing recovery data, adding a serial number or time information to the file name or the recovery data itself enables identifying the most recent of multiple files.

The recovery data can also be located using recovery data identification information instead of recovery data address information. More specifically, recovery data can be identified by writing a recovery data ID to the beginning of each recovery data block using a bit pattern that does not exist in the AV data, and then searching for this bit pattern.

When such identification information is recorded in the recovery data, it is not necessary to record recovery data address information to disc. If the AV data is MPEG data, the AV data can be recognized from the MPEG header, and it is thus easy to know if AV data is recorded. Therefore, by recording ID information distinct from the AV data in the recovery data, the recovery data can be found after recognizing that AV data is recorded, and the recovery data can be reliably recognized separately to the AV data.

A serial number or time information could be used to denote the newest recovery data. In this case the recovery data containing the highest serial number or the most recent time information is known to be the newest recovery data. The newest recovery data can therefore be identified even if multiple recovery data entries are found on a disc.

Furthermore, if the AV data and recovery data are alternately interleaved at a predetermined data length (byte count, sector count, block count, or other), the location of the next recovery data can be determined without the above ID information.

Each recovery data entry also preferably contains the start address (e.g., LBA, CHS, byte or sector offset information) of the next recovery data. After the size of the next AV data segment to be written is determined in this case, the recovery data can be written and an AV data segment of that size can be written.

Yet further preferably, the recovery data contains the address of the AV data recording area 202 to which the AV data is being recorded. This address could be the LBA, CHS, or other sector address information identifying where the AV data is written. By including the address of the AV data in the recovery data, AV data address information can be recovered for the file system in the recovery process following a power supply interruption.

Furthermore, because the AV data and recovery data are interleaved, the present invention can restore file management information for all AV data recorded up to the last recovery data.

Yet further, AV data may be recorded to a disc where the recording area is fragmented. In this case, by recording the locations of all previously recorded AV data to the recovery data, the present invention can know where AV data is recorded in the fragmented recording area and can therefore use the recovery data to restore the AV data.

The recovery data could contain file management information for the AV data being recorded. This enables restoring the file management information for the file system before a power supply interruption.

When a new file is created and data is written to the file, disc space for recording the data is generally reserved before writing begins. The file system therefore updates a bitmap used to manage available disc space, and adds the new file information to the file management information. The updated file management information is therefore temporarily cached. However, if a power supply interruption occurs before cache content can be written to disc, the cached file management information is lost.

Because our invention interleaves the recorded AV data and recovery data, the file management information can be restored using the recovery data interleaved to the AV data.

The recovery data could also contain information relating to the AV data playback time. This playback time information preferably includes a time table correlating the GOP size, I-picture size, frame count, audio attributes, or other information to the playback time. Using a time table enables special playback modes such as fast-rewind, fast-forward, and playing frames of a specified time. This playback time information can be reconstructed by analyzing the AV data during the recovery process, but analyzing AV data is time consuming. Recording such playback time information as part of the recovery data therefore makes it possible to get the playback time information during the recovery process without analyzing the AV data, and therefore shortens the time needed for the recovery process.

Further preferably the recovery data contains the start address of an I-picture in the AV data. This I-picture address is not limited to the LBA or CHS value, and can be expressed using an offset value of a specific number of bytes from the beginning of the AV data file or a fixed byte offset of sectors and blocks. I-picture addresses can be reconstructed by analyzing the AV data during the recovery process, but analyzing AV data is time consuming. Recording the I-picture address as part of the recovery data therefore makes it possible to get the I-picture address during the recovery process without analyzing the AV data, and therefore shortens the time needed for the recovery process.

The GOP size, I-picture size, frame count, and audio attributes are generated by the encoder unit 101 in real time during AV data encoding. Therefore, by recording this information as part of the recovery data interleaved with the AV data, the correlation between this data and the AV data is retained and data can be recovered efficiently.

The recording process is described further below with reference to the flow chart in FIG. 6.

The recording method of the present invention has a recovery data compiling step 401, recording address generating step 408, previous recovery data address generating step 409, next recovery data address generating step 410, difference information generating step 411, recovery data splitting step 412, and interleaving step 413.

The recovery data compiling step 401 generates recovery data parameters and constructs the recovery data. The recovery data compiling step 401 has a file management information generating step 402, playback time detection step 403, I-picture address detection step 404, serial number generating step 405, time information generating step 406, and ID information generating step 407.

File management information generating step 402 produces file management information for the recorded AV data.

Playback time detection step 403 gets information relating to the playback time of the recorded AV data.

I-picture address detection step 404 gets the start address of an I-picture in the recorded AV data when the AV data is MPEG encoded.

Serial number generating step 405 assigns a serial number to each recovery data address or recovery data block.

Time information generating step 406 generates a time stamp denoting when the recovery data address information or recovery data was recorded.

ID information generating step 407 generates identification information for separating the recovery data from other recorded data.

Recording address generating step 408 generates the address where the AV data and recovery data are recorded.

Previous recovery data address generating step 409 generates the address of the previously recorded recovery data block, and next recovery data address generating step 410 generates the address of the recovery data block recorded next.

Difference information generating step 411 produces difference information (such as the start address of an I-picture that is present only in the current AV data segment from among all recorded AV data segments) from the previously recorded recovery data.

Recovery data splitting step 412 segments the recovery data into at least two data segments.

Interleaving step 413 records while interleaving the AV data and recovery data.

Figure 6:
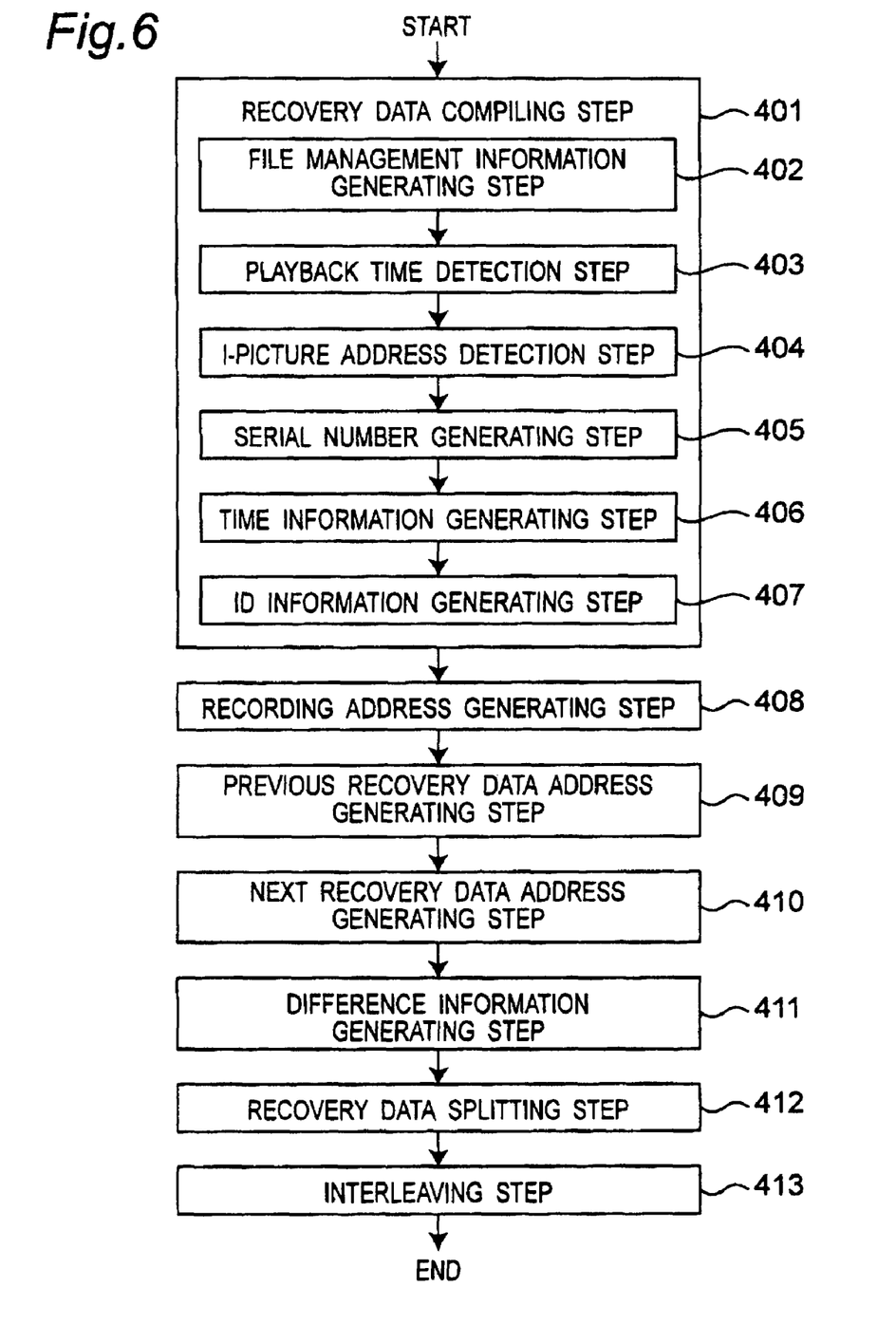
FIG. 6 is a flow chart of the recording process in a preferred embodiment of the invention.

It should be noted that recovery data compiling step 401 in FIG. 6 could comprise only any one of any of steps 402 to 407. Furthermore, steps 408 to 413 could be reduced to just the interleaving step 413.

The encoder unit 101 in this embodiment of the invention compresses the input AV signal using MPEG encoding, for example. If a compressed AV signal such as from a digital broadcast satellite is recorded, however, the encoder unit 101 can simply extract the encoding parameters from the input AV signal and does not need to re-encode the AV signal. The full benefit of the present invention as described above is also achieved in this case.

The recovery process executed when power is supplied is described next with reference to FIG. 7, a flow chart of a recovery process needed for playback.

The end flag evaluation step 701 first reads the end flag to determine if the last data recording process was completed normally. If the data recording process did not end normally, the end flag is OFF as described above, and is ON if the recording process ended normally.

If the end flag is OFF, the recovery data address reading step 702 runs to read the recovery data address information recorded in the recovery data address recording area 204. The recovery data address information stores the LBA, CHS, or other value indicating where the recovery data is recorded in the AV data recording area 202.

The recovery data reading step 703 then read the recovery data, and the next recovery data address information reading step 704 gets the address of the recovery data recorded next.

The last recovery data detection step 705 then determines whether any more recovery data that should be read is recorded. Whether there is any more recovery data to read can be determined by detecting, for example, whether a 0 (zero) is recorded in the acquired next recovery data. If the next recovery data that was acquired has this bit set to 0, another recovery data block is not present and the last recovery data has been read.

If last recovery data detection step 705 determines there is a next recovery data block to read, control loops back and steps 703 to 705 repeat. If last recovery data detection step 705 determines there is no more recovery data to read, the file system recovery process 706 runs.

The file system recovery process (step 706) restores the file system using the recovery data read from disc. For example, using the file management information stored in the recovery data, step 706 recovers the file attributes contained in the superblocks written to superblock recording area 203 of the recording medium. These file attributes could include the file or directory name, sector location information, data size, user name, and access privileges.

The media mounting step 707 then mounts the file system for the recording medium.

Next, the AV data recovery process step 708 then restores the AV data management information used for special playback modes (e.g., fast-forward, reverse play) using the playback time information and I-picture address information in the recovery data.

If the end flag is ON in end flag evaluation step 701, the last recording operation ended normally. The file system is therefore mounted in media mounting step 709 and the recovery process ends without actually recovering any data.

Figure 9A:
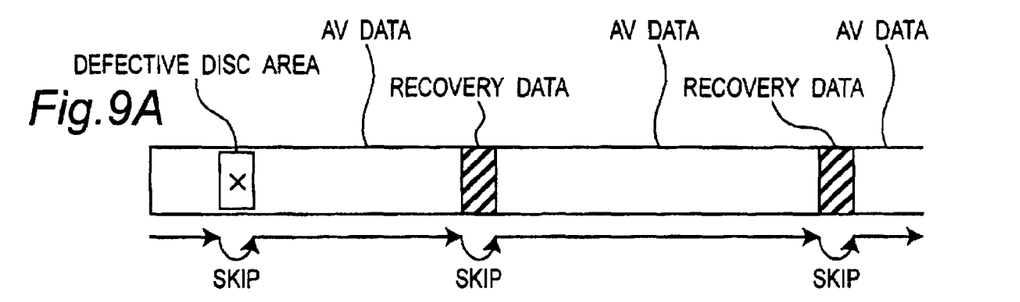
FIG. 9 describes the operation of the present invention.

If the area where recovery data is recorded is registered in the disc management information as a defective disc area, the area where the recovery data is recorded will be skipped when reading AV data other than during the recovery process, and the AV data will be easily read continuously. FIG. 9A shows an example in which the recovery data recording area is registered in the disc management information as a bad disc area. If AV data is read as shown in FIG. 9A, the recovery data can be skipped using the same process used to skip a defective disc area.

AV data is generally written to a contiguous disc area of at least a minimum size (e.g., 256 MB) in order to efficiently read and write data. In addition, AV data is only recorded to an area where the size or number of defective disc areas in that contiguous disc area of a minimum size is less than a defined upper limit. The size of the contiguous disc area used for recording AV data and the size and number of defective disc areas in this contiguous disc area are defined by the file system used for AV data recording, such as the DVD standard or Blu-Ray Disc standard. When the recovery data recording area is handled the same as a defective disc area, the AV data is recorded to an area meeting the file system standard after adding the size or number of recovery data recording areas to the size or number of defective disc areas defined by the file system standard. This assures efficient reading and writing conforming to the file system standard even when recording recovery data.

Figure 9B:
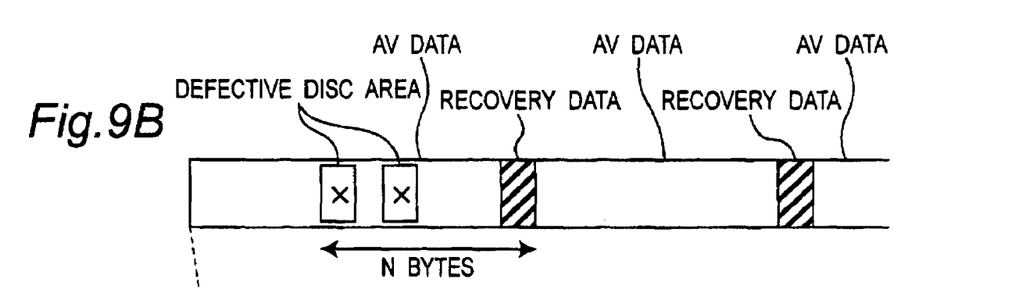
Figure 9C:
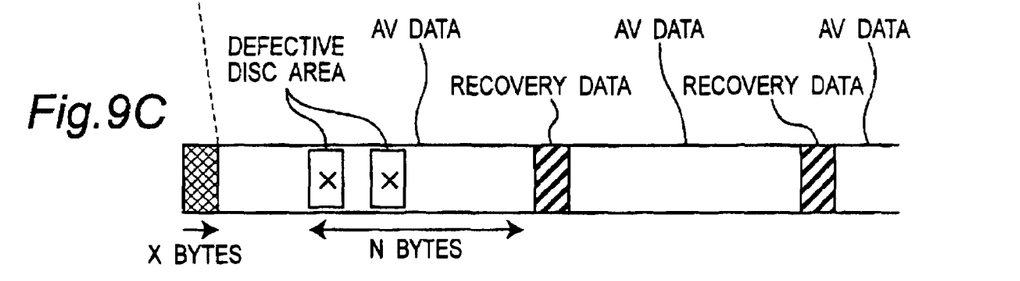

FIG. 9B and FIG. 9C show an example in which the file system requires less than three defective disc areas in a contiguous disc area of n-bytes in the AV data recording area. In FIG. 9B there are two defective disc areas and one recovery data area, that is, a total of three areas, in an n-byte area, thus not satisfying the file system standard. Therefore, as shown in FIG. 9C, the AV data is recorded shifted X bytes so that there are less than a total of three defective disc areas and recovery data areas within an n-byte area. FIG. 9C shows shifting the AV data recording area X bytes, but if the total number of defective disc areas and recovery data areas is three or more within an n-byte area, the file system requirements can be met by, for example, cancelling recording the recovery data or delaying the recovery data recording time.

Second Embodiment

A second embodiment of the invention is described next with reference to FIG. 8, a schematic block diagram of a recording apparatus according to the present invention.

Figure 8:
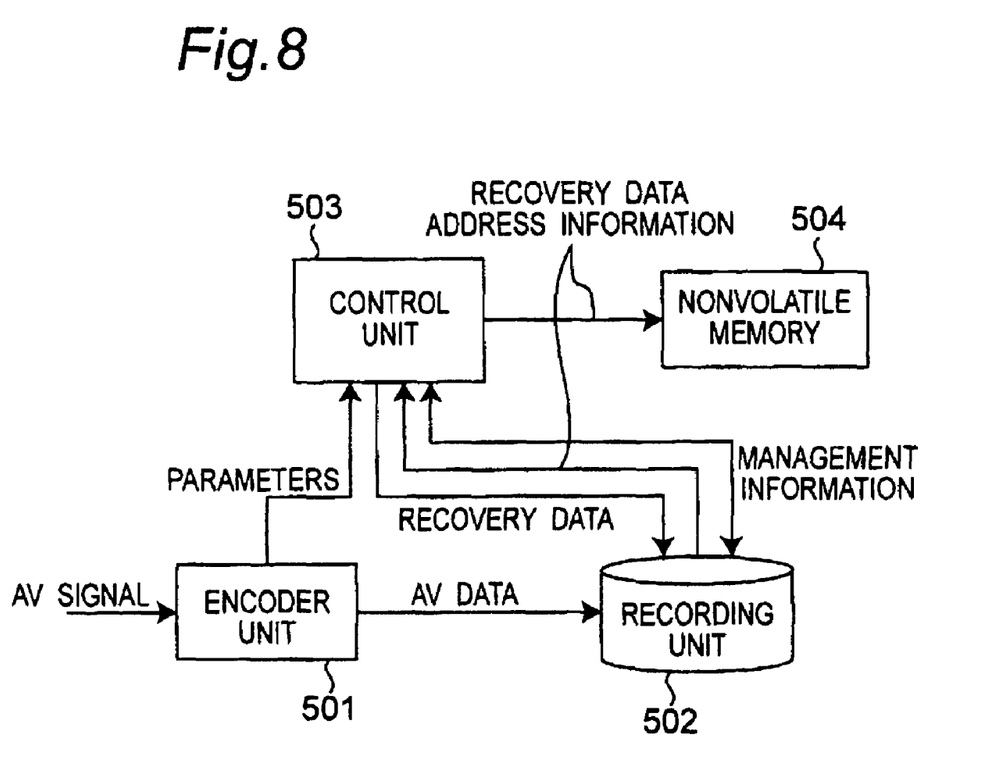
FIG. 8 is a block diagram of a recording apparatus according to a second embodiment of the present invention.

As shown in FIG. 8 this recording apparatus has an encoder unit 501, recording unit 502 for recording to a recording medium, a control unit 503, and a recording medium such as nonvolatile memory 504. The input AV signal includes at least audio data or video data.

The encoder unit 501, recording unit 502, and control unit 503 are same as the corresponding components of the first embodiment described above. The recording apparatus of this second embodiment differs from the first embodiment in having nonvolatile memory 504.

The recording unit 502 and control unit 503 have the same configuration and operation as the corresponding units in the first embodiment shown in FIG. 1. They differ from the first embodiment, however, in that the recovery data address information generated by the recording address generator 104 of the recording unit 502 is passed to control unit 503, and control unit 503 then records the recovery data address information to nonvolatile memory 504.

The nonvolatile memory 504 stores the recovery data address information shown in FIG. 5. The recovery data address information shown in FIG. 5A and FIG. 5B are the same in this embodiment as in the first embodiment. The same benefit described in the first embodiment can be achieved whether the recovery data address information is recorded to the recording medium or to nonvolatile memory 504.

If the recovery data address information is recorded to nonvolatile memory 504 instead of the recording medium, a head seek operation is not needed each time the recovery data is updated when recording AV data because the recovery data address information can be simply updated in nonvolatile memory 504. Searching for recovery data during the recovery process is therefore faster than in the first embodiment without lowering the AV data write bitrate.

Figure 7:
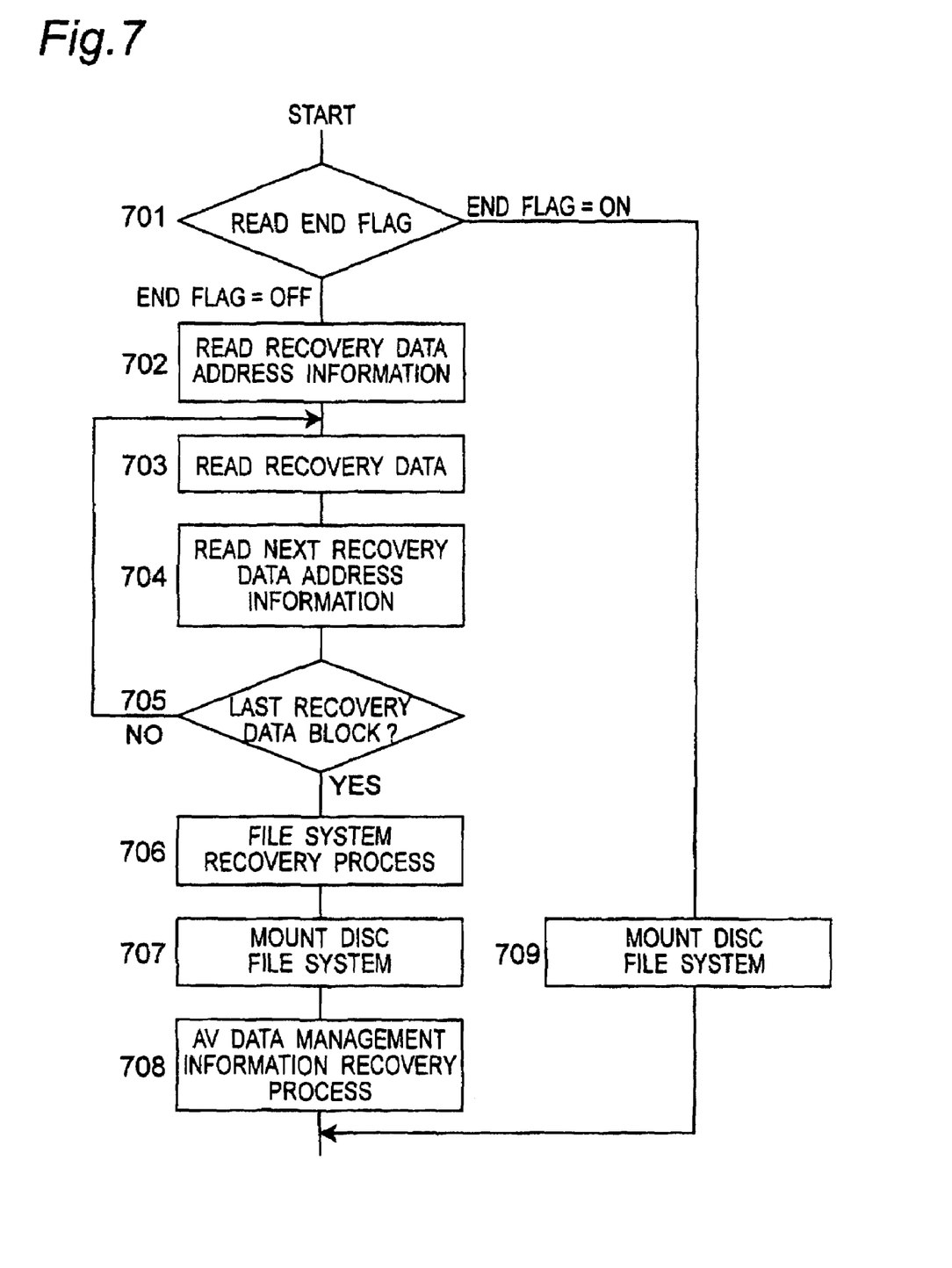
FIG. 7 is a flow chart of a recovery process required for playback in a preferred embodiment of the invention.

The recording and playback method of this second embodiment is the same as described in the first embodiment with reference to FIG. 6 and FIG. 7, except that the recovery data address information generated in the recording address generating step 408 is written to nonvolatile memory 504, and the recovery data address information read in the recovery data address reading step 702 is read from nonvolatile memory 504.

Typical AV devices record the recovery data to nonvolatile memory and not to disc. If the recovery data is recorded to disc and the address of the recovery data is recorded to nonvolatile memory, however, the size of the required nonvolatile memory can be reduced and the cost of the AV device can therefore also be reduced.

Furthermore, if recording unit 502 and nonvolatile memory 504 can be removed from the main recording apparatus, the recovery process can be run on a separate device with a data recovery function. A portable movie camera may become unusable because the battery runs out during recording or the camera is dropped and damaged. In this case, the recording unit 502 and nonvolatile memory 504 could be removed from the movie camera and installed in another device so that the recorded content can be recovered to a playable state.

The content of the recovery data in this case is the same as described in the first embodiment.

The encoder unit 501 in this embodiment of the invention compresses the input AV signal using MPEG encoding, for example. If a compressed AV signal such as from a digital broadcast satellite is recorded, however, the encoder unit 501 can simply extract the encoding parameters from the input AV signal and does not need to re-encode the AV signal. The full benefit of the present invention as described above is also achieved in this case.

The recording apparatus and recording method of the present invention shall not be limited to recording audio and video data, and can be used in other fields for recording various types of data.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording apparatus for recording to a recording medium AV data containing at least one of audio data and video data, and recovery data for restoring management information for the AV data when AV data recording does not end normally, the apparatus comprising: a recovery data generator for generating recovery data for each constant or variable period; an AV data generator for generating AV data; and a recorder for interleaving the recovery data with the AV data, and recording simultaneously interleaved recovery data and the AV data on the recording medium during AV data recording such that the recovery data and the AV data are recorded in an alternating fashion and in adjacent areas on the recording medium during AV data recording, wherein the recovery data contains file management information for the recorded AV data.

2. A recording apparatus as described in claim 1, wherein the recovery data contains at least one of recording address information for the recorded AV data, playback time information for the recorded AV data, and a start address for an I-picture in the recorded AV data.

3. A recording apparatus as described in claim 1, wherein the recovery data contains at least one of a serial number or time information, address information for previously recorded recovery data, difference information from previously recorded recovery data, information acquired for previously recorded recovery data, address information for recovery data recorded next, and identification information for identifying recovery data.

4. A recording apparatus as described in claim 1, wherein the recovery data is interleaved with AV data units of a specific size.

5. A recording apparatus as described in claim 1, wherein the recovery data is interleaved with AV data units of a specific recording time.

6. A recording apparatus as described in claim 1, wherein the recovery data is interleaved every specific recording unit of AV data.

7. A recording method for recording to a recording medium AV data containing at least one of audio data and video data, and recovery data for restoring management information for the AV data when AV data recording does not end normally, the method comprising: generating recovery data for each constant or variable period; generating AV data; interleaving the recovery data with the AV data; and recording simultaneously the interleaved recovery data and the AV data on the recording medium during AV data recording such that the recovery data and the AV data are recorded in an alternating fashion and in adjacent areas on the recording medium during AV data recording, wherein the recovery data contains file management information for the recorded AV data.

8. A recording method as described in claim 7, wherein the recovery data contains at least one of recording address information for the recorded AV data, playback time information for the recorded AV data, and a start address for an I-picture in the recorded AV data.

9. A recording method as described in claim 7, wherein the recovery data contains at least one of a serial number or time information, address information for previously recorded recovery data, difference information from previously recorded recovery data, information acquired for previously recorded recovery data, address information for recovery data recorded next, and identification information for identifying recovery data.

10. A recording method as described in claim 7, wherein the recovery data is interleaved with AV data units of a specific size.

11. A recording method as described in claim 7, wherein the recovery data is interleaved with AV data units of a specific recording time.

12. A recording method as described in claim 7, wherein the recovery data is interleaved every specific recording unit of AV data.

* * * * *